May 27, 1924.

G. E. JOHNSON

SANDING DEVICE FOR AUTOMOBILES

Filed June 20, 1923

1,495,694

INVENTOR.
Gustaf Em. Johnson
BY
ATTORNEY

Patented May 27, 1924.

1,495,694

UNITED STATES PATENT OFFICE.

GUSTAF EM. JOHNSON, OF GRIDLEY, CALIFORNIA.

SANDING DEVICE FOR AUTMOBILES.

Application filed June 20, 1923. Serial No. 646,720.

*To all whom it may concern:*

Be it known that I, GUSTAF EM. JOHNSON, a citizen of the United States, residing at Gridley, county of Butte, State of California, have invented certain new and useful Improvements in Sanding Devices for Automobiles; and I do declare the following to be a full, clear, and exact description of the same, reference being had to the accompanying drawings, and to the characters of reference marked thereon, which form a part of this application.

This invention relates to an improved means for preventing skidding of motor vehicles on wet pavements, such as frequently occurs, and often results in serious property damage or human injury and some times death.

Skidding, as is well known, usually takes place when the brakes are applied, and the principal object of my invention therefore is to provide means for sprinkling sand onto the tires of the vehicle, this material having well-known non-slippage properties when used sparsely, control means for the sprinkling of the sand being provided arranged to be actuated only when the brakes are applied.

I have also arranged for the ready disconnection of the sand control means from the brake applying means, when it is unnecessary to use the same, as in dry weather, when to sprinkle sand onto the tires would be a mere waste of the material.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

In carrying out my invention it will be evident that different makes of cars will necessitate somewhat different arrangement of the various parts, and the accompanying drawings of course only show the arrangement on a certain make of car, and even on such car, the arrangement may be varied.

Figure 1:
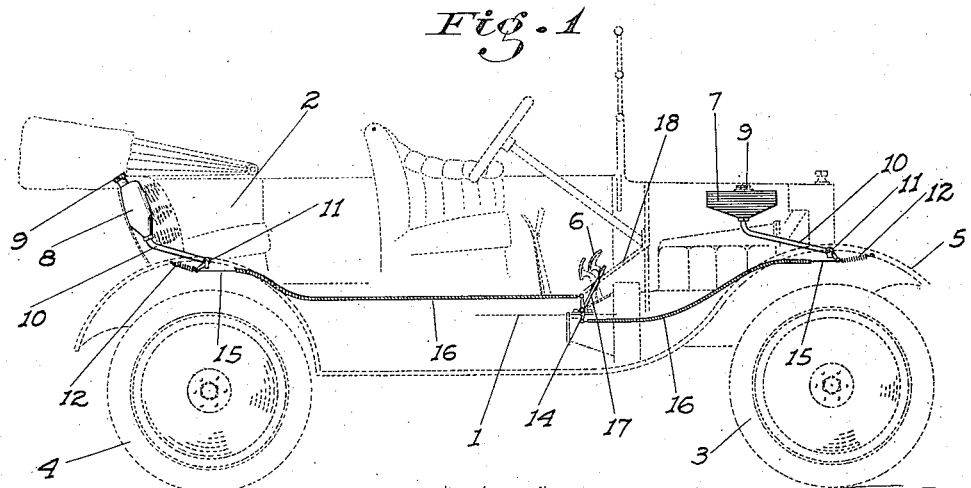
Fig. 1 is a side outline of an automobile showing my sanding device as applied thereto.
Figure 2:
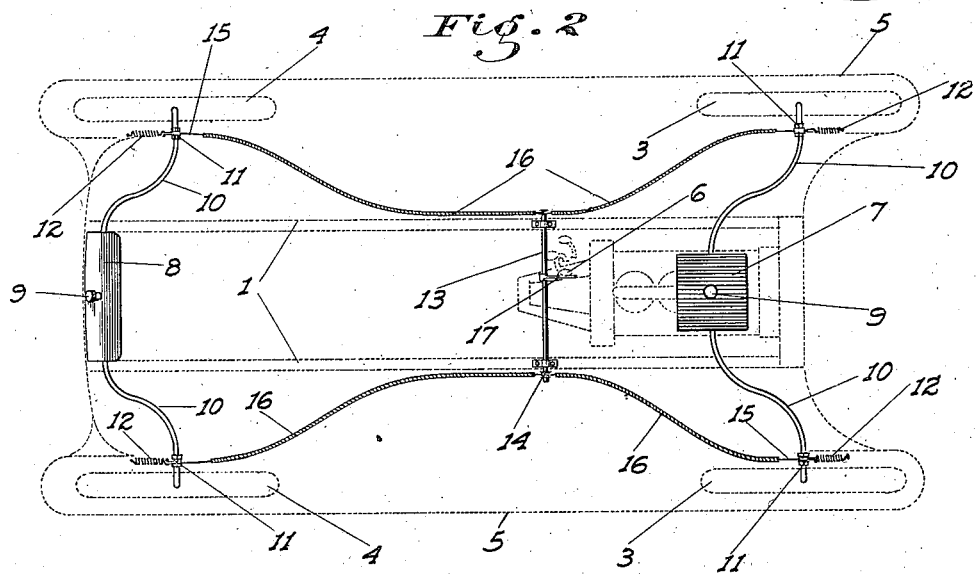
Fig. 2 is a top plan view of the same.

Referring now more particularly to the characters of reference on the drawings, the numeral 1 denotes the frames of the vehicle, 2 the body, 3 and 4 the front and rear wheels, 5 the fenders or mudguards, and 6 the brake pedal.

My invention comprises preferably an independent pair of sand containers 7 and 8, one somewhere near and above the front wheels, as shown under the hood, and the other similarly located with respect to the rear wheels, as at the back of the body as indicated. Removable filler caps 9 are provided for the containers, so that they may be easily filled when necessary.

Sand pipes 10 extend down from the containers and through the fenders 5 so as to discharge onto the tread of the tires of the wheels.

Suitable control valves 11 are placed in the pipes adjacent their lower ends, these valves being automatically closed by springs 12.

Means to positively open all these valves in unison with the depression of the pedal 6 is provided as follows:

Journaled on the frames 1 adjacent the pedal 6 and extending transversely of the vehicle is a rod or shaft 13, having at its outer ends vertical arms 14, extending on both sides of the shaft.

Pull wires or cords 15 extend from the outer ends of these arms to the valves 11, said wires being preferably enclosed in flexible tubes or housings 16, so as to allow the wire to be deflected from a straight line either horizontally or vertically, and thus enable the wires to follow the contour of the fenders and other parts without the necessity of using direction-changing pulleys.

The valves on each side of the vehicle are arranged so that one will open with a forward movement of its wire, and the other with a rearward movement of its wire, the latter being of course connected to the respective ends of the arm 14 to attain this result.

Figures 3, 4:
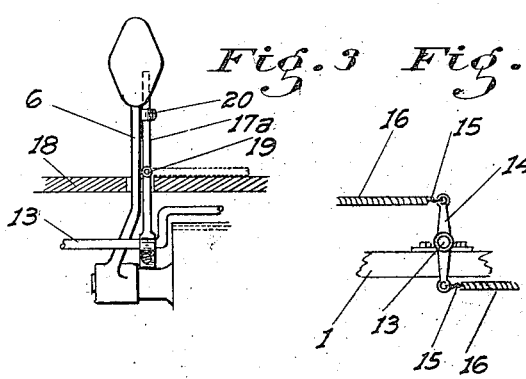
Fig. 3 is a fragmentary view of a brake pedal showing the connection of the sand control member thereto.
Fig. 4 is a fragmentary end view of a sand-valve actuating rod and its connected parts.

Secured on and projecting upwardly from the cross shaft 13 adjacent the pedal 6 is a lever 17, whose upper portion 17ᵃ, above the floorboard 18 through which the pedal passes, is hinged to the main portion 17, as at 19, in a plane at right angles to the plane of movement of the pedal and lever, so that said hinged portion may move to be in vertical alinement with the main lever portion to then engage a clip 20 attached to the side of the pedal 6, or it may be disengaged from the clip and swung away from the pedal to rest on the floor when the use of the sand is not required, as indicated in Fig. 3.

It will therefore be evident that in operation, assuming the lever is engaged with the pedal-clip, when the pedal is depressed, the lever will move forwardly, rotating the shaft 13, and causing the various wires 15 to be pulled, opening the sand valves and allowing the sand to flow onto the tires, so that the latter, after a half revolution or less, will firmly grip the pavement, the sand then between the tire and pavement providing a non-slip medium.

I have shown in the present instance the sand arranged to discharge by gravity, but it is to be understood that if conditions of installation or otherwise should demand, a force feed of the sand, by air or otherwise could be installed in conection with the system.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A sanding device for motor vehicles comprising a sand container, pipes leading therefrom to discharge onto the tires of the wheels, closures for said pipes, a lever extending up adjacent the brake pedal of the vehicle, means conecting said lever with the closures, a hinged extension on the upper end of the lever arranged to be folded down in a direction at right angles to the movement of the lever, and a clip projecting from the pedal adapted to removably receive a portion of said extension when the latter is raised.

2. A sanding device for motor vehicles comprising sand containing means, pipes leading therefrom to discharge onto the tires of all the wheels of the vehicle, individual closure members in the pipes, and means for opening all said closure members simultaneously.

3. A sanding device for motor vehicles comprising sand containing means, pipes leading therefrom to discharge onto the tires of all the wheels of the vehicle, individual closure members in the pipes, and means for opening all said closure members simultaneously actuated upon applying the brakes of the vehicle.

In testimony whereof I affix my signature.

GUSTAF EM. JOHNSON.